(12) United States Patent
Bychkov et al.

(10) Patent No.: US 8,234,620 B1
(45) Date of Patent: Jul. 31, 2012

(54) METHOD AND SYSTEM FOR SOFTWARE DEVELOPMENT USING DISTRIBUTED COMPUTING RESOURCES

(75) Inventors: Vitaly V. Bychkov, St. Petersburg (RU); Michael C. Frisino, Redwood City, CA (US); Vladimir V. Yaroslavskiy, Saint-Petersburg (RU); Sergey V. Lunegov, Saint-Petersburg (RU)

(73) Assignee: Oracle America, Inc., Redwood City, CA (US)

( * ) Notice: Subject to any disclaimer, the term of this patent is extended or adjusted under 35 U.S.C. 154(b) by 1492 days.

(21) Appl. No.: 11/796,751

(22) Filed: Apr. 30, 2007

(51) Int. Cl.
  *G06F 9/44* (2006.01)
(52) U.S. Cl. .................. 717/100; 717/103
(58) Field of Classification Search ............... None
  See application file for complete search history.

(56) References Cited

U.S. PATENT DOCUMENTS

| | | | |
|---|---|---|---|
| 6,601,233 B1* | 7/2003 | Underwood | 717/102 |
| 6,928,637 B2* | 8/2005 | Leherbauer | 717/122 |
| 7,512,903 B2* | 3/2009 | Hudson, Jr. | 715/853 |
| 7,526,759 B2* | 4/2009 | Sanjar et al. | 717/135 |
| 2004/0243979 A1* | 12/2004 | Pugh et al. | 717/124 |
| 2005/0033846 A1* | 2/2005 | Sankaranarayan et al. | 709/226 |
| 2005/0044205 A1* | 2/2005 | Sankaranarayan et al. | 709/223 |
| 2006/0259897 A1* | 11/2006 | Zorn et al. | 717/118 |
| 2007/0283282 A1* | 12/2007 | Bonfiglio et al. | 715/762 |
| 2008/0313594 A1* | 12/2008 | Smith | 717/100 |

OTHER PUBLICATIONS

Sendhil Annamalai, "A Remote Computing Broker in .Net", 2003, retrieved from <http://people.cis.ksu.edu/~sendhil/msreport/Remote_Computing_Broker.pdf>, Total pp. 36.*

* cited by examiner

*Primary Examiner* — Insun Kang
*Assistant Examiner* — Marina Lee
(74) *Attorney, Agent, or Firm* — Osha Liang LLP

(57) ABSTRACT

A method for software development that includes receiving, by a computing resource broker, a request to perform a software development operation on a software program using a computing resource, wherein the request is from an integrated development environment (IDE) used to develop the software program, obtaining an authentication protocol for the computing resource from a repository managed by the computing resource broker, authenticating with the computing resource using the authentication protocol, wherein the computing resource broker is authenticated to use the computing resource, sending a request to perform the software development operation to the computing resource, receiving a result of performing the software development operation from the computing resource, and sending the result to the IDE, wherein the result is displayed to a developer of the software program.

20 Claims, 8 Drawing Sheets

METHOD AND SYSTEM FOR SOFTWARE DEVELOPMENT USING DISTRIBUTED COMPUTING RESOURCES

BACKGROUND

In general, software developers use an integrated development environment (IDE) when developing software programs. An IDE usually includes a number of software development tools made available to the software developer through a graphical user interface (GUI) designed to facilitate the use of these tools. The software development tools may include a source code editor, a compiler or interpreter, tools for automating the software build process, and a debugger. Depending on the language(s) supported by the IDE, tools for object oriented software development such as a class browser, an object inspector, and a class hierarchy diagram may also be included. In addition, some IDEs include tools for construction of a GUI and a version control system.

In many IDEs, the tools are designed to be used on a single computer system. That is, compilation, build, and debug of a software program under development are performed on the same computer system where the IDE is executing.

SUMMARY

In general, in one aspect, the invention relates to a method for software development that includes receiving, by a computing resource broker, a request to perform a software development operation on a software program using a computing resource, wherein the request is from an integrated development environment (IDE) used to develop the software program, obtaining an authentication protocol for the computing resource from a repository managed by the computing resource broker, authenticating with the computing resource using the authentication protocol, wherein the computing resource broker is authenticated to use the computing resource, sending a request to perform the software development operation to the computing resource, receiving a result of performing the software development operation from the computing resource, and sending the result to the IDE, wherein the result is displayed to a developer of the software program.

In general, in one aspect, the invention relates to a system for software development that includes a repository configured to store an authentication protocol for each computing resource of a plurality of computing resources registered with a computing resource broker. The system may further include the computing resource broker configured to receive a request to perform a software development operation on a software program using a computing resource of the plurality of computing resources, wherein the request is from an integrated development environment (IDE) used to develop the software program, obtain an authentication protocol for the computing resource from the repository, authenticate with the computing resource using the authentication protocol, send a request to perform the software development operation to the computing resource, receive a result of performing the software development operation from the computing resource, and send the result to the IDE, wherein the result is displayed to a developer of the software program.

In general, in one aspect, the invention relates to a computer readable medium that includes computer program code embodied therein for causing a computer system to facilitate software development, the computer program code that includes program instructions to receive, by a computing resource broker, a request to perform a software development operation on a software program using a computing resource, wherein the request is from an integrated development environment (IDE) used to develop the software program, obtain an authentication protocol for the computing resource from a repository managed by the computing resource broker, authenticate with the computing resource using the authentication protocol, wherein the computing resource broker is authenticated to use the computing resource, send a request to perform the software development operation to the computing resource, receive a result of performing the software development operation from the computing resource, and send the result to the IDE, wherein the result is displayed to a developer of the software program.

Other aspects of the invention will be apparent from the following description and the appended claims.

DETAILED DESCRIPTION

Figure 1A:
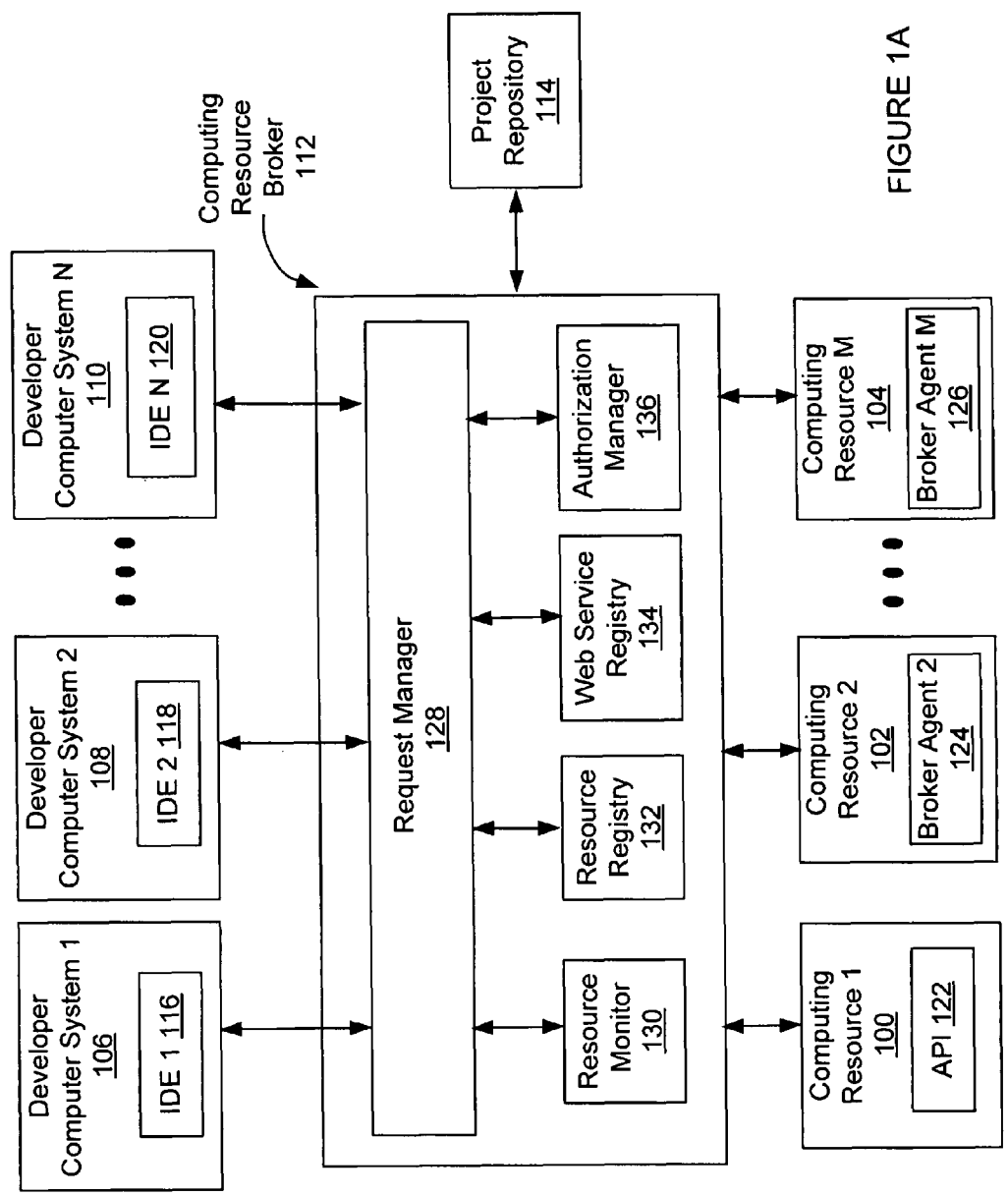
FIGS. 1A and 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for software development using distributed computing resources. Specifically, embodiments of the invention use a computing resource broker which acts as an intermediary between multiple computing resources and software developers using one or more integrated development environments (IDE). More specifically, in one or more embodiments of the invention, a software developer may develop a software program using an IDE connected to the computing resource broker. The computing resource broker operates as a backend to the IDE to allow the software developer to use one or more computing resources connected to the computing resource broker during the process of developing the software program.

During the development process, when the software developer using the IDE selects a software development operation (e.g., compile, build, debug, etc.) to be performed on the software program, the IDE sends a request to the computing resource broker to have the software development operation performed. The computing resource broker receives the request from the IDE and manages the use of a computing resource to execute the desired software development operation. That is, the computing resource broker performs the functions required to cause the desired software development operation to be performed on the software program by a computing resource. These functions may include authentication with the computing resource, transferring the software program to the computing resource, and initiating performance of the desired operation on the software program by the computing resource. Further, in one or more embodiments of the invention, these functions may also include receiving the results of performing the desired software development operation on the software program from the computing resource and sending the results to the IDE.

FIG. 1A shows a system in accordance with one or more embodiments of the invention. As shown in FIG. 1, the system includes computing resources (e.g., computing resource 1 (100), computing resource 2 (102), computing resource M (104)), developer computer systems (e.g., developer computer system 1 (106), developer computer system 2 (108), developer computer system N (110)), a computing resource broker (112), and a project repository (114).

A computing resource (e.g., computing resource 1 (100), computing resource 2 (102), computing resource M (104)) includes functionality to perform software development operations (e.g., compile, build, debug, etc.) on a software program under development. That is, a computing resource (e.g., computing resource 1 (100), computing resource 2 (102), computing resource M (104)) may have both hardware and software for compiling, building, debugging, and executing a developer program. For example, a computing resource may be a distributed computer system, a mainframe computer system, a cluster of servers, a supercomputer, a massively parallel processing system, or single processor computer.

In one or more embodiments of the invention, each computing resource (e.g., computing resource 1 (100), computing resource 2 (102), computing resource M (104))) is an autonomous computer system. In particular, a computing resource may have a different execution environment (e.g., file system, operating system, compilers, management applications, etc.) from other computing resources. Thus, for example, computing resource 1 (100) may be a shared memory multiprocessor which is managed separately from computing resource 2 (102) which may be a server cluster. Moreover, each computing resource may have a front-end that differs from the front-ends of the other computing resources. The front-end may provide authentication and an interface for using the computing resource. Furthermore, each computing resource may be operated by a different business entity (e.g., a university, a corporation, a supercomputing center, etc.)

Further, in one or more embodiments of the invention, the front-ends on some or all of the computing resources (e.g., computing resource 1 (100), computing resource 2 (102), computing resource M (104)) have an application programming interface (API) (e.g., API (122)) as an interface for using the computing resource. The API provides an interface to interact with the front-end of the computing resource. When a request is received by the front-end using the API, the front-end may determine which component(s) of the computing resource processes the request. In some embodiments of the invention, the API of a computing resource may be published to inform entities wishing to use the computing resource of the API definition. Further, in one or more embodiments of the invention, the API may be the API of a web service executing on the computing resource.

More specifically, the API (e.g., API (122)) provides an interface whereby software development services may be requested from the computing resource (e.g., computing resource (100)) by the computing resource broker (112) (described below). In one or more embodiments of the invention, the computing resource broker (112) may use the API (e.g., API (122)) to provide authentication information to the computing resource (e.g., computing resource (100)), to transfer a software program to the computing resource, to request that the computing resource perform one or more software development operations (e.g., compile, build, execute in debug mode, etc.) on a software program under development, and to perform other functions related to using the computing resource to provide software development services to an IDE (e.g., IDE 1 (116), IDE 2 (118), IDE N (120)) (described below).

In one or more embodiments of the invention, some computing resources (e.g., computing resource 2 (102), computing resource M (104)) may not provide an API for using the computing resource. In such scenario, a broker agent (e.g., broker agent (124), broker agent (126)) may be installed on the computing resource. In one or more embodiments of the invention, a broker agent is an interface program that provides an API that may be used by the computing resource broker (112) to request software development services from the computing resource (e.g., computing resource 2 (102), computing resource M (104)). The broker agent (e.g., broker agent (124), broker agent (126)) includes functionality to receive a software development service request, cause the software development service to be performed by the computing resource (e.g., computing resource 2 (102), computing resource M (104)), and return the result of performing the software development service.

In addition to computing resources, the system includes one or more developer computer systems (e.g., developer computer system 1 (106), developer computer system 2 (108), developer computer system N (110)) in accordance with one or more embodiments of the invention. A developer computer system is a computing device used to develop a software program. For example, the developer computer system may be a personal computer used by a developer, a collection of personal computers (e.g., home computer(s), work computer(s), etc.), a terminal server and a workstation which accesses the terminal server, a combination of the aforementioned types, etc.

In one or more embodiments of the invention, an IDE (e.g., IDE 1 (116), IDE 2 (118), IDE N (120)) may be accessed by the developer computer system (e.g., developer computer system 1 (106), developer computer system 2 (108), developer computer system N (110)). An IDE (e.g., IDE 1 (116), IDE 2 (118), IDE N (120)) is an application which facilitates the development of software programs. Specifically, the IDE may have a design tool for planning and visualizing a software program, a source code editor, a compiler or interpreter, a debugger, and a version control system. The IDE may include the capability to organize the components of a software program under development as a project. More specifically, a software program usually includes several components such as files containing the source code of the program, files containing the object code of the program, files containing commands for building the software application, etc. The IDE may include functionality to create a folder or directory for the software program and to store the various components as folders and/or files within the project folder.

In one or more embodiments of the invention, the IDE (e.g., IDE 1 (116), IDE 2 (118), IDE N (120)) may include a graphical user interface (GUI) for using the various capabilities of the IDE. The GUI may be displayed in a window a developer computer system (e.g., developer computer system 1 (106), developer computer system 2 (108), developer computer system N (110)). Within the window may be one or more menu bars and buttons as well a variety of panes. The panes may show the source code, the source file structure, a view of different classes, or any other display of a tool available by the IDE. As an alternative to a GUI, the IDE may be a program editor with a command line interface, such as Vi developed by Bill Joy or Emacs developed by Richard Stallman.

In one or more embodiments of the invention, an IDE (e.g., IDE 1 (116), IDE 2 (118), IDE N (120)) includes functionality to interface with a computing resource broker (112) to request software development services. In one or more embodiments of the invention, an IDE (e.g., IDE 1 (116), IDE 2 (118), IDE N (120)) may be connected to the computing resource broker (112) through a network, such as a wide area network, a local area network, etc. Further, in one or more embodiments of the invention, an IDE (e.g., IDE 1 (116), IDE 2 (118), IDE N (120)) may communicate with the computing resource broker (112) using the interface of one or more web services (not shown) provided by the computing resource broker (112).

In one or more embodiments of the invention, an IDE (e.g., IDE 1 (116), IDE 2 (118), IDE N (120)) may be include functionality to allow a developer to specify a computing resource (e.g., computing resource 1 (100), computing resource 2 (102), computing resource M (104)) that the computing resource broker (112) is to use to perform software development services requested by the IDE. Specifically, a developer may select a computing resource from a list of computing resources presented by the IDE (e.g., IDE 1 (116), IDE 2 (118), IDE N (120)). The developer may be prompted to select one or more computing resources when configuring the IDE, when setting up a new project, when the developer attempts to compile a software program, etc. In some embodiments of the invention, the developer may also change the selected computing resource by selecting a menu option that presents the list of computing resources. Further, in one or more embodiments of the invention, an IDE (e.g., IDE 1 (116), IDE 2 (118), IDE N (120)) may also include functionality to allow a developer to select specific software development tools (e.g., compilers, debuggers, and the like) available on a selected computing resource to be used in performing the requested software development services. An IDE (e.g., IDE 1 (116), IDE 2 (118), IDE N (120)) may also include functionality to allow a developer to specify the processor architecture and/or number of processors to be used on a computing resource.

Once a computing resource is selected, the IDE (e.g., IDE 1 (116), IDE 2 (118), IDE N (120)) sends the selection to the computing resource broker (112). The developer may then use the IDE to perform development tasks. As the developer performs these tasks, the IDE (e.g., IDE 1 (116), IDE 2 (118), IDE N (120)) may communicate with the computing resource broker (112) as needed to request that software development services required to accomplish the development tasks be performed by the selected computing resource.

In one or more embodiments of the invention, the computing resource broker (112) acts as an intermediary between an IDE (e.g., IDE 1 (116), IDE 2 (118), IDE N (120)) and the computing resources (e.g., computing resource 1 (100), computing resource 2 (102), computing resource M (104)). Specifically, the computing resource broker (112) includes functionality to receive a request for a software development service from an IDE (e.g., IDE 1 (116), IDE 2 (118), IDE N (120)) and to fulfill the request using, if needed, a computing resource known to the computing resource broker (112). A computing resource is known to the computing resource broker (112) when the computing resource is registered with the computing resource broker. Registering a computing resource is described below in reference to the resource registry (132), FIG. 1B and FIG. 2. The software development services are described in more detail below in reference to the web service registry (134).

In one or more embodiments of the invention, the computing resource broker includes a request manager (128), a resource monitor (130), a resource registry (132), a web service registry (134), and an authorization manager (136). The request manager (128) manages requests from IDEs (e.g., IDE (116), IDE (118), IDE (120)). That is, the request manager (128) includes functionality to receive a request for a software development service from an IDE (e.g., IDE (116), IDE (118), IDE (120)), to cause the requested service to be performed, and to return the result of performing the service to the IDE. The request manager (128) uses the other components of the computing resource broker (112) and the project repository (114) as needed to fulfill the request. For example, in some embodiments of the invention, if an IDE (e.g., IDE (116), IDE (118), IDE (120)) asks the computing resource broker (112) for a list of computing resources available to a developer using the IDE, the request manager (128) may asked the resource monitor (130) for a list of computing resources (e.g., computing resource 1 (100), computing resource 2 (102), computing resource M (104)) known to the computing resource broker (112). The request manager (128) may then ask the authorization manager (136) which of these computing resources the developer is authorized to use and return the resulting filtered list of computing resources to the requesting IDE.

The resource monitor (130) includes functionality to monitor the status and state of the computing resources (e.g., computing resource 1 (100), computing resource 2 (102), computing resource M (104)) known to the computing resource broker (112). For example, the resource monitor may monitor such things as whether a computing resource is currently running, offline, busy, etc., and how many tasks the computing resource broker (112) currently has executing on a computing resource. The resource monitor (130) may monitor a computing resource using either an API (e.g., API (122)) available on the computing resource or a broker agent (e.g., broker agent 2 (124), broker agent M (126)) if an API is not available.

The resource registry (132) includes functionality for requesting software development services from the computing resources (e.g., computing resource 1 (100), computing resource 2 (102), computing resource M (104)) known to the computing resource broker (112). That is, the resource registry (132) includes functionality to request services from the computing resources as needed for the computing resource broker (112) to provide a software development service to the developer (i.e., a software development service requested by the IDE used by the developer).

The resource registry (132) may also include functionality for registering a computing resource with the computing resource broker (132). More specifically, the resource registry (132) may include functionality to create and manage a computing resource account on the computing resource broker (112) for each registered computing resource. A computing resource account may include a protocol to be followed to authenticate a developer with a computing resource and a protocol to be followed when requesting services from the computing resource. Computing resource accounts and computing resource registration are explained in more detail below in reference to FIG. 1B and FIG. 2.

The authorization manager (136) includes functionality for performing any needed authorization and authentication required for use of the computing resource broker (112) and the computing resources (e.g., computing resource 1 (100), computing resource 2 (102), computing resource M (104)) registered with the computing resource broker (112). More specifically, the authorization manager (136) may include functionality to authenticate a developer using an IDE before allowing the IDE to use the software development services provided by the computing resource broker (112). The authorization manager (136) may also include functionality to authenticate a developer with a computing resource (e.g., computing resource 1 (100), computing resource 2 (102), computing resource M (104)) before the computing resource broker (112) is allowed to use the computing resource to provide a software development service to the developer (i.e., a software development service requested by the IDE used by the developer).

The authorization manager (136) may also include functionality to create and manage a developer account on the computing resource broker (112) for a developer using an IDE (e.g., IDE 1 (116), IDE 2 (118), IDE N (120)). A developer account may include authentication information for authorizing a developer to use the computing resource broker (112) and for authorizing a developer to use one or more computing resources registered with the computing resource broker (112). Developer accounts and developer authentication are explained in more detail below in reference to FIG. 1B and FIG. 3.

The web service registry (134) serves as a registry for the web services provided by the computing resource broker (112). More specifically, in some embodiments of the invention, the software development services provided by the computing resource broker (112) are implemented as web services. In some embodiments of the invention, the web service registry also serves as a registry for the web services provided by the computing resources (e.g., computing resource 1 (100), computing resource 2 (102), computing resource M (104)). In one or more embodiments of the invention, the web service registry (134) includes Web Services Description Language (WSDL) documents describing the protocol bindings and message formats required to interact with the web services provided by the computing resource broker (112) and the computing resources (e.g., computing resource 1 (100), computing resource 2 (102), computing resource M (104)). In some embodiments of the invention, the web service registry (134) is a Universal Description, Discovery, and Integration (UDDI) registry.

In one or more embodiments of the invention, the software development services provided by the computing resource broker (112) may include a project repository service, a resources service, a compilation service, an execute service, a technical support service, and a special information service. A project repository service includes functionality for providing project management services to an IDE (e.g., IDE 1 (116), IDE 2 (118), IDE N (120)). More specifically, the project repository service provides project management services to permit a developer using an IDE to organize and develop software programs as projects in the project repository (114). These project management services may include creating a project, storing a file as part of a project, retrieving a file included in a project, making a backup of a project, providing a list of projects, and the like.

For example, in some embodiments of the invention, if a developer is viewing a project in an IDE GUI and opens a file included in the project, the IDE sends a request for the file to the project repository service. The project repository service receives the request and interfaces with the request manager (128) to retrieve the file from the project repository. The project repository service then returns the file to the IDE in response to the request. Similarly, if the developer makes changes to the file and then closes the file, the IDE sends the altered file to the project repository service along with a request to store the file. The project repository service receives the request and interfaces with the request manager (128) to cause the file to be stored in the project repository (114). The project repository service also responds to the request to indicate the result of processing the request (i.e., whether or not the file is successfully stored).

A resources service includes functionality for providing resource management services to an IDE (e.g., IDE 1 (116), IDE 2 (118), IDE N (120)). More specifically, the resources service provides resource management services to permit a developer using an IDE to manage use of computing resources. These resource management services may include requesting access to a computing resource, getting a list of available computing resources, checking the status of a computing resource, and the like.

For example, in some embodiments of the invention, if a developer is setting up a project for a software program in an IDE, the developer may wish to select a computing resource (e.g., computing resource 1 (100), computing resource 2 (102), computing resource M (104)) as the default computing resource to use for providing software development services as the software program is developed. Using the IDE GUI, the developer may request a list of available computing resources. The IDE sends a request for the list of computing resources to the resources service. The resources service receives the request and interfaces with the request manager (128) to request the list. The request manager (128) uses the resource monitor (130) and the resource registry (132) to generate a list of computing resources available to the developer and provides the list to the resources service. The resources service returns this list to the IDE in response to the request. The IDE then presents the list to the developer to choose a computing resource for the project. Similarly, if the developer later wishes to change the computing resource for the project, the developer may again request the list of computing resources, whereupon the IDE again requests the list using the resources service.

A compilation service includes functionality for providing compile, build, and debug services to an IDE (e.g., IDE 1 (116), IDE 2 (118), IDE N (120)). More specifically, the compilation service provides compile, build, and debug services to permit a developer using an IDE to compile, build and debug a software program using a computing resource (e.g., computing resource 1 (100), computing resource 2 (102), computing resource M (104)). These compile, build, and debug services may include requesting compilation of a file in a software program, requesting compilation of a project, requesting the build of a project, requesting compilation results, requesting build results, invoking a debugger, and the like.

For example, in some embodiments of the invention, when a developer requests the build of project in an IDE GUI, the IDE sends a request for the build to the compilation service. The compilation service receives the request and interfaces with the request manager (128) to request that a build of the project be performed on a computing resource previously selected by the developer for the project. The request manager (128) uses the resource monitor (130), the resource registry (132), the authorization manager (136), and the web service registry (134) to request the build service from the computing resource. A copy of the project may be sent to the computing resource as part of the request for the build service. The result of the build service (i.e., the result of performing the build operation on the computing resource) is returned to compilation service. If the developer is still logged into the IDE, the compilation service returns the result of the build operation to the IDE. If the developer is no longer logged into the IDE, the compilation service stores the result of the build operation in the project repository (114) for later retrieval by the developer.

When the developer logs into an IDE again, the developer may request the result of the build, whereupon the IDE sends a request for the build results to the compilation service. The compilation service receives the request and interfaces with the request manager (128) to retrieve the build results from the project repository (114). The compilation service then returns the build results to the IDE for presentation to the developer.

A execute service includes functionality for providing execution services to an IDE (e.g., IDE 1 (116), IDE 2 (118), IDE N (120)). More specifically, the execute service provides execution services to permit a developer using an IDE to execute a software program using a computing resource (e.g., computing resource 1 (100), computing resource 2 (102), computing resource M (104)). These execution services may include requesting execution of a project, requesting status of a project execution, requesting execution results, requesting that execution of a project be aborted, and the like.

For example, in some embodiments of the invention, when a developer requests the execution of project in an IDE GUI, the IDE sends a request for the execution to the execution service. The execution service receives the request and interfaces with the request manager (128) to request that the project be executed on a computing resource previously selected by the developer for the project. The request manager (128) uses the resource monitor (130), the resource registry (132), the authorization manager (136), and the web service registry (134) to request the execution service from the computing resource. A copy of the project may be sent to the computing resource as part of the request for the execution service. The result of the execution service (i.e., the result of executing the project on the computing resource) is returned to execution service. If the developer is still logged into the IDE, the execution service returns the result of the execution operation to the IDE. If the developer is no longer logged into the IDE, the execution service stores the result of the execution operation in the project repository (114) for later retrieval by the developer.

When the developer logs into an IDE again, the developer may request the result of executing the project, whereupon the IDE sends a request for the execution results to the execution service. The execution service receives the request and interfaces with the request manager (128) to retrieve the execution results from the project repository (114). The execution service then returns the execution results to the IDE for presentation to the developer.

A technical support service includes functionality for providing technical support services to an IDE (e.g., IDE 1 (116), IDE 2 (118), IDE N (120)). More specifically, the technical support service provides technical support services to permit a developer using an IDE to request technical support for issues using the computing resource broker and/or the computing resources. These technical support services may include requesting technical support, getting a list of available computing resources, checking the status of a computing resource, and the like.

A special information service includes functionality for providing notification services to an IDE (e.g., IDE 1 (116), IDE 2 (118), IDE N (120)). More specifically, the special information service provides notification services to permit a developer using an IDE to request and receive notifications regarding the status of requested software development services. These notification services may include setting up a notification profile and modifying a notification profile. The notifications may be delivered to the developer via electronic mail, short message service (SMS) messages, or any suitable electronic notification medium.

The computing resource broker (112) is connected to a project repository (114). In one or more embodiments of the invention, a project repository (114) is a storage unit, such as database, file system, file, etc. The project repository (114) may exist on a single storage device or may be distributed across multiple storage devices. Further, in one or more embodiments of the invention, a project repository (114) may be a file server. The project repository (114) may be directly connected to the computing resource or connected to the computing resource via a network.

The project repository (114) stores the projects under development by the developers using the IDEs on the developer computer systems (e.g., developer computer system 1 (106), developer computer system 2 (108), developer computer system N (110)). In some embodiments of the invention, the project repository also stores authentication information both for authenticating developers to use the computing resource broker (112) and for authenticating developers with the computing resources (e.g., computing resource 1 (100), computing resource 2 (102), computing resource M (104)). Further, in some embodiments of the inventions, the project repository (114) also stores service request information for one or more of the computing resources (e.g., computing resource 1 (100), computing resource 2 (102), computing resource M (104)) that may be used to request that the computing resource perform a software development operation for a developer (i.e., request a software development service).

Figure 1B:
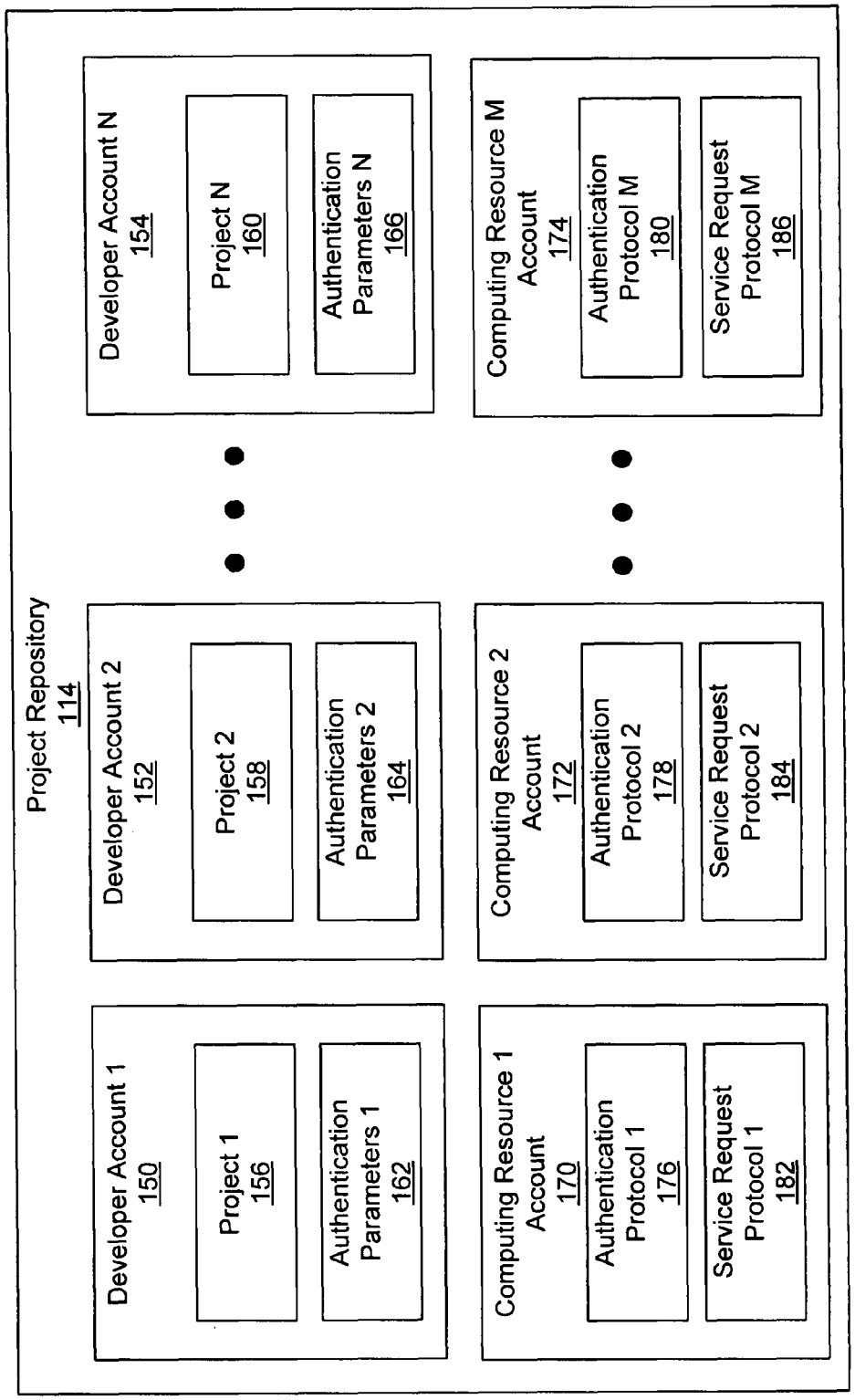

FIG. 1B shows a project repository (114) in accordance with one or more embodiments of the invention. The project repository (114) includes developer accounts (e.g., developer account 1 (150), developer account 2 (152), developer account N (154)), and computing resource accounts (e.g., computing resource 1 account (170), computing resource 2 account (172), computing resource M account (174)). A developer account (e.g., developer account 1 (150), developer account 2 (152), developer account N (154)) stores data for developers. In one or more embodiments of the invention, a developer account (e.g., developer account 1 (150), developer account 2 (152), developer account N (154)) may include one or more projects under development (e.g., project 1 (156), project 2(158), project N (158)) and authentication parameters (e.g., authentication parameters 1 (162), authentication parameters 2(164), authentication parameters N (166)).

A project (e.g., project 1 (156), project 2(158), project N (158)) is a collection of program files, input files, and metadata files created by a developer using an IDE. The program files may be the source code, object code, and executables of a software program. The source code may be written in virtually any programming language. The metadata files may contain information to identify the various components of the project. Additionally, in one or more embodiments of the invention, the project may have a build file that details how to create an executable for the software program.

In addition to the project (e.g., project 1 (156), project 2(158), project N (158)), a developer account (e.g., developer account 1 (150), developer account 2 (152), developer account N (154)) may include authentication parameters (e.g., authentication parameters 1 (162), authentication parameters 2(164), authentication parameters N (166)). Authentication parameters (e.g., authentication parameters 1 (162), authentication parameters 2(164), authentication parameters N (166)) are data for confirming the identity of the developer. For example, authentication parameters (e.g., authentication parameters 1 (162), authentication parameters 2(164), authentication parameters N (166)) may be a username and password, biometric data (e.g., data from a fingerprint or retina scan), an equation that when executed creates a password based on time, or any other data that may be used for authentication.

The authentication parameters (e.g., authentication parameters 1 (162), authentication parameters 2(164), authentication parameters N (166)) may include data used for confirming the identity of the developer to access the computing resource broker (112). Alternatively or additionally, the authentication parameters (e.g., authentication parameters 1 (162), authentication parameters 2(164), authentication parameters N (166)) may include data for the computing resource broker (112) to provide to a computing resource (e.g., computing resource 1 (100), computing resource 2 (102), computing resource M (104)) on behalf of the developer for confirming the identity of the developer. Thus, the authentication parameters (e.g., authentication parameters 1 (162), authentication parameters 2(164), authentication parameters N (166)) may include authentication parameters specific to each computing resource the developer has permission to use and to the computing resource broker (112). For example, each computing resource may require different types of authentication parameters. That is, one computing resource may use data derived from a fingerprint to confirm the identity of the developer while another computing resource uses username and password. In such a scenario, both the data derived from the fingerprint and the username and password may be stored in the developer account.

In some embodiments of the invention, the same authentication parameters may be used for more than one computing resource. For example, the same login identifier and password may be used to create an account for the developer on each computing resource. More specifically, the login identifier and password may be stored once in the repository for all computing resources that accept these authentication parameters.

In addition to a developer account (e.g., developer account 1 (150), developer account 2 (152), developer account N (154)), the project repository (114) may include a computing resource account (e.g., computing resource 1 account (170), computing resource 2 account (172), computing resource M account (174)) for each computing resource (e.g., computing resource 1 (100), computing resource 2 (102), computing resource M (104)) registered with the computing resource broker (112). A computing resource account (e.g., computing resource 1 account (170), computing resource 2 account (172), computing resource M account (174)) provides protocols (e.g., authentication protocol 1 (176), authentication protocol 2 (178), authentication protocol M (180), service request protocol 1 (182), service request protocol 2 (184), service request protocol M (186)) for accessing a computing resource. The protocols specify how to use the specific API (or broker agent) of the computing resource (e.g., computing resource 1 (100), computing resource 2 (102), computing resource M (104)) represented by the computing resource account (e.g., computing resource 1 account (170), computing resource 2 account (172), computing resource M account (174)).

The protocols (e.g., authentication protocol 1 (176), authentication protocol 2 (178), authentication protocol M (180), service request protocol 1 (182), service request protocol 2 (184), service request protocol M (186)) may exist in the form of a management program, such as a script, which is specific to the API (or broker agent) of the corresponding computing resource (e.g., computing resource 1 (100), computing resource 2 (102), computing resource M (104)). When executed by the computing resource broker (112), the management program may include the instructions for the computing resource broker (112) to perform an authentication procedure with the computing resource and manage requesting software development services from the computing resource.

Alternatively, the protocols (e.g., authentication protocol 1 (176), authentication protocol 2 (178), authentication protocol M (180), service request protocol 1 (182), service request protocol 2 (184), service request protocol M (186)) may exist as one or more data files in a standardized format. The standardized format may specify, for example, that specific tags delineate the instructions required to perform an operation. For example, the data file may have a start tag stating "authentication" followed by the instructions from the API for performing the authentication followed by an end tag which states "end authentication." When the standardized format is used, the computing resource broker (112) may include functionality to read the data file and extract the instructions specific to the computing resource for performing the operation, such as authentication.

In one or more embodiments of the invention, the protocols (e.g., authentication protocol 1 (176), authentication protocol 2 (178), authentication protocol M (180), service request protocol 1 (182), service request protocol 2 (184), service request protocol M (186)) may include an authentication protocol (e.g., authentication protocol 1 (176), authentication protocol 2 (178), authentication protocol M (180)) and a service request protocol (e.g., service request protocol 1 (182), service request protocol 2 (184), service request protocol M (186)). The authentication protocol (e.g., authentication protocol 1 (176), authentication protocol 2 (178), authentication protocol M (180)) specifies how to authenticate with the computing resource (e.g., computing resource 1 (100), computing resource 2 (102), computing resource M (104)). Specifically, in some embodiments of the invention, the authentication protocol may be a management program which specifies the location of authentication parameters for the computing resource and how to interact with the computing resource to provide the authentication parameters.

A service request protocol (e.g., service request protocol 1 (182), service request protocol 2 (184), service request protocol M (186)) specifies how to interact with the computing resource (e.g., computing resource 1 (100), computing resource 2 (102), computing resource M (104)) to request software development services. The commands in the service request protocol (e.g., service request protocol 1 (182), service request protocol 2 (184), service request protocol M (186)) may be dependent on the API (or broker agent) of the computing resource (e.g., computing resource 1 (100), computing resource 2 (102), computing resource M (104)) and the programming language of the developer project. Further, in some embodiments of the invention, the service request protocol (e.g., service request protocol 1 (182), service request protocol 2 (184), service request protocol M (186)) and the authentication protocol (e.g., authentication protocol 1 (176), authentication protocol 2 (178), authentication protocol M (180)) may be a single management program.

In addition to protocols, a computing resource account (e.g., computing resource 1 account (170), computing resource 2 account (172), computing resource M account (174)) may also include administrative information about the use of the computing resource (e.g., computing resource 1 (100), computing resource 2 (102), computing resource M (104)) by the computing resource broker (112). For example, if there is a charge for using the computing resource, the computing resource account may include invoice information. In addition, a computing resource account (e.g., computing resource 1 account (170), computing resource 2 account (172), computing resource M account (174)) may include statistical information about the use of the computing resource, such as the number of developer projects executed by the computing resource, the number of outstanding developer projects executed by the computing resource, the average response time for the developer projects, or any other such information.

While not shown in FIG. 1, in one or more embodiments of the invention, the computing resource broker (112) and the project repository (114) may be part of a developer computer system (e.g., developer computer system 1 (106), developer computer system 2 (108), developer computer system N (110)).

FIGS. 2-5 show flowcharts in accordance with one or more embodiments of the invention. While the various steps in these flowcharts are presented and described sequentially, one of ordinary skill will appreciate that some or all of the steps may be executed in different orders, may be omitted, and/or may be executed in parallel.

Figure 2:
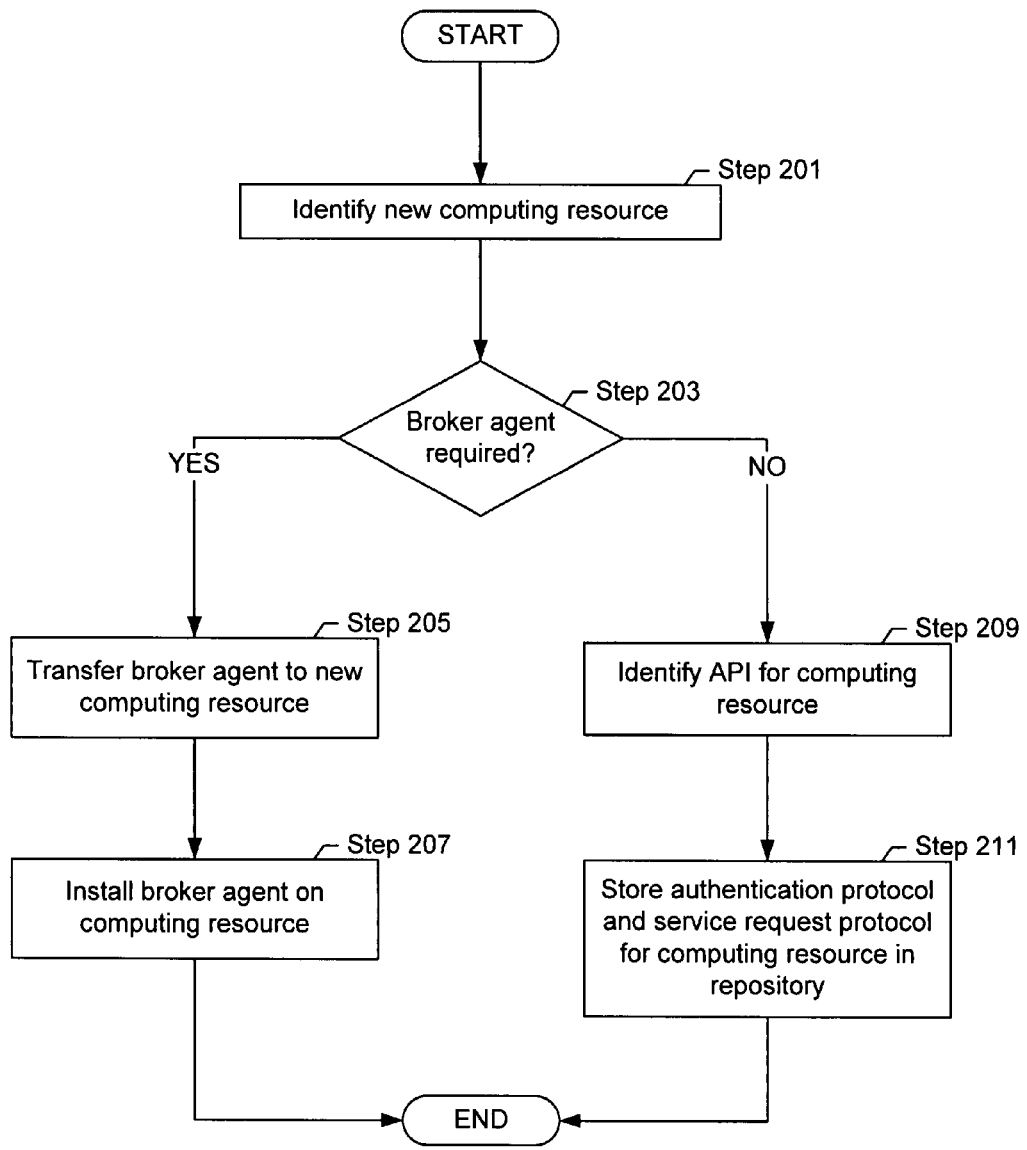
FIGS. 2-5 show flowcharts in accordance with one or more embodiments of the invention.

FIG. 2 shows a flowchart of a method for adding a new computing resource to the computing resources known by the computing resource broker in accordance with one or more embodiments of the invention. Initially, a new computing resource is identified (Step 201). Identifying a new computing resource may be performed, for example, by an administrator of the computing resource broker. Specifically, the administrator may enter into an arrangement to use the computing resource with the entity owning the computing resource. For example, an administrator at the University of Wyoming may realize that a new supercomputer is available at the San Diego Supercomputing Center (SDSC). Upon contacting SDSC, the administrator may enter into an agreement with SDSC to allow students at the University of Wyoming to use the new supercomputer. In another example, the administrator at the University of Wyoming may add a new computing resource to a collection of computing resources owned by the University of Wyoming.

In one or more embodiments of the invention, the new computing resource may be identified automatically. For example, a discovery program, such as a web crawler, may be used to search for new computing resources. When new computing resources are identified, the discovery program may inform an administrator or another program of the new computing resource.

When the new computing resource is identified, an account may be created on the new computing resource for the computing resource broker. The account may include authentication protocol and storage necessary for use of the new computing resource. In one or more embodiments of the invention, the account may be created by the administrator who manages the new computing resource.

Continuing with FIG. 2, a determination is made whether a broker agent is required (Step 203). As discussed above, a broker agent may be required when the computing resource does not have a preexisting API. An administrator of the computing resource broker may determine whether a preexisting API exists from support documents (e.g., web pages, community forums, etc.) which are made available for the computing resource.

If a broker agent is required, a broker agent is transferred to the computing resource (Step 205). Transferring the broker agent may be performed by downloading the broker agent from a network (e.g., the Internet, local area network), copying the broker agent (e.g., by using file transfer protocol, secure copy, etc.), obtaining a storage device having the broker agent (e.g., compact disk, flash drive, etc.), or performing any other technique for transferring the broker agent to the new computing resource. Further, the broker agent is installed on the computing resource (Step 207). When installing the broker agent, the installation may be configured for the computing resource. Specifically, the configuration may specify when to accept requests for software development services, authentication procedures, etc. When the broker agent is installed on the new computing resource, the new computing resource may be accessed by the computing resource broker. Additionally, the authentication protocol and the service request protocol corresponding to the API of the broker agent may be stored in the project repository.

Alternatively, if the broker agent is not required, then the API is identified for the computing resource (Step 209). The description of the API for the computing resource may be published by the entity owning the computing resource. For example, the API may be posted on the web or described in a manual available to the administrator of the computing resource broker.

An authentication protocol and a service request protocol are then stored in the project repository for the computing resource (Step 211). In one or more embodiments of the invention, the administrator of the computing resource broker may create a management program based on the description of the API of the computing resource and store the management program as the authentication protocol and service request protocol. Alternatively, the administrator may identify components of the authentication protocol and service request protocol, such as a protocol for requesting execution of a program, from the API description and delineate each of the components with tags in the authentication protocol and service request protocol using a standardized format (discussed above).

Figure 3:
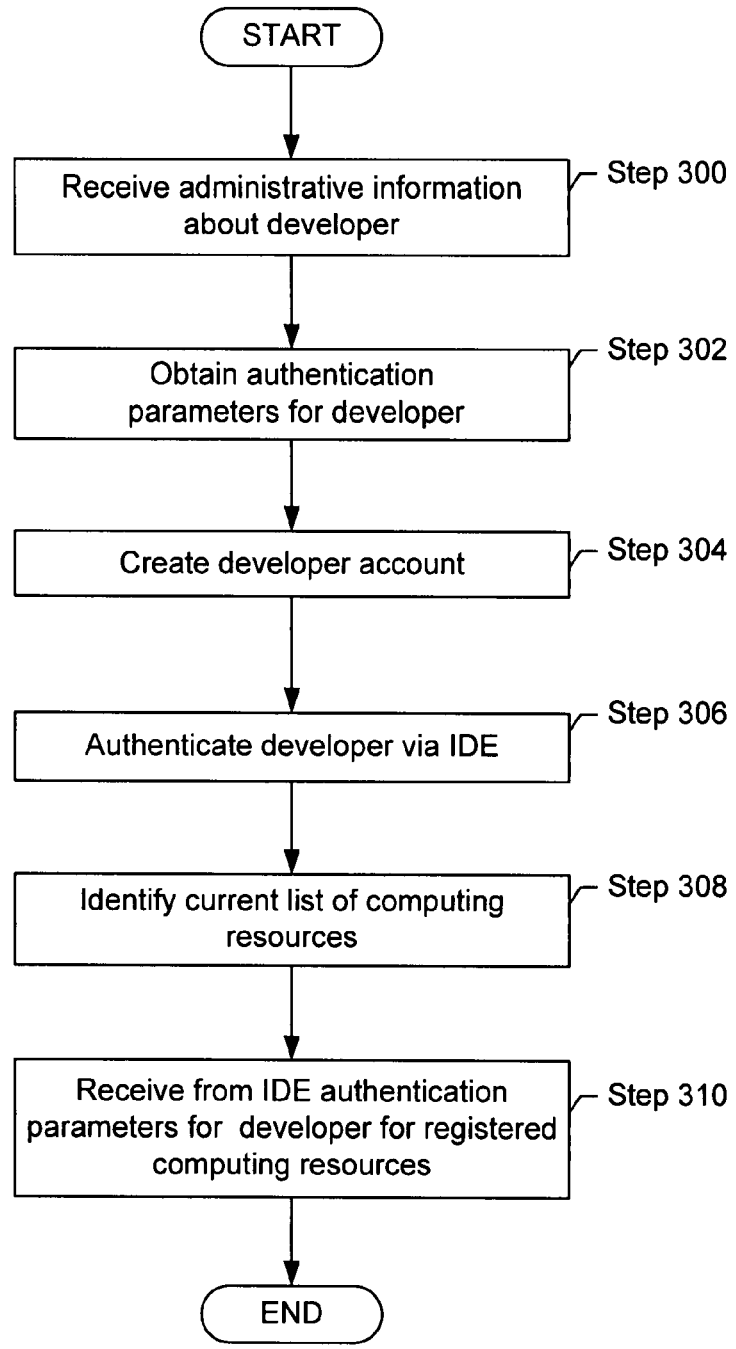

In addition to adding computing resources, new developer accounts may also be added to the computing resource broker. FIG. 3 shows a flowchart of a method for creating an account for a new developer in accordance with one or more embodiments of the invention. Initially, administrative information about the developer is obtained in accordance with one or more embodiments of the invention (Step 300). Specifically, the developer may provide a name, or other such identifier. The developer may give the administrative information to an administrator of the computing resource broker or may submit the administrative information directly to the computing resource broker or repository. For example, the developer may submit the administrative information in a form or using an IDE.

Further, authentication parameters are obtained for the developer (Step 302). The authentication parameters specify how the developer is to authenticate with the computing resource broker. For example, the computing resource broker or an administrator may assign authentication parameters to the developer. Alternatively, the developer may request specific authentication parameters and the computing resource broker may determine whether to approve of the requested authentication parameters.

Additionally, a developer account for the developer may be created (Step 304). In particular, an entry is created and storage space for the developer is reserved in the project repository in one or more embodiments of the invention. Further, the developer account may be populated with the administrative information and authentication parameters to be used by the developer.

Using the developer account, the developer may use an IDE to communicate with the computing resource broker.

Specifically, while using the IDE, the developer may be authenticated to the computing resource broker via the IDE (Step 306). At this stage a communication link between the computing resource broker and the IDE are created. Thus, data may be transferred between the computing resource broker and the IDE.

Next, the computing resource broker sends a list of computing resources to the IDE (Step 308). The list of computing resources is a listing of the computing resources known to the computing resource broker. The listing may be filtered according to the developer. For example, if the developer is not authorized to use a specific computing resource which is known to the computing resource broker, then the current list of computing resources may exclude the specific computing resource.

In a more specific example, consider the scenario in which a university has computer science students and computer science professors. The computer science professors may have permission to use all computing resources. In contrast, the computer science students may have permission to use only a subset of the computing resources. When a developer account is created, the computing resource broker may identify the developer as a computer science student or a computer science professor. If the developer is identified as a computer science student, then the current list of computing resources may only include the subset of computing resources. However, if the developer is a computer science professor, then the current list of computing resources may include all computing resources.

Continuing with FIG. 3, the IDE then displays the list of computing resources for the developer. The computing resource broker then receives the developer's authentication parameters for computing resources in the list of computing resources (Step 310). The authentication parameters are used to authenticate the developer to the computing resource. Specifically, if a developer has an account on a computing resource, then the developer may submit authentication parameters for the account to the computing resource broker using, for example, the IDE.

Alternatively, the developer may provide the authentication parameters directly to the computing resource broker or repository. If the developer does not have a preexisting account on a computing resource, an account may be created for the developer. For example, the developer, the computing resource broker, the administrator of the computing resource broker, or the administrator of the computing resource may create an account for the developer on the computing resource.

In another alternative, rather than the developer having an account on each computing resource, the developer may use an account of the computing resource broker or an entity managing the computing resource broker. For example, if the entity managing the computing resource broker is a university and the computing resource is a supercomputer owned by a supercomputing center, the university may have an agreement with the supercomputing center which allows students of the university use of the supercomputer. In the agreement, rather than each student having an account on the supercomputer, the university may have a single account on the supercomputer. The account on the supercomputer may be accessible by the computing resource broker for use by the students. Specifically, when students develop a developer program, the students may use the single account to execute the developer program. Thus, the students of the university are not required to provide authentication parameters for the supercomputer in one or more embodiments of the invention.

Using the IDE, a developer creates a software program. Specifically, the developer uses the tools of the IDE to write the code for the software program. As the developer is developing the software program, the software program is stored in the project repository as a project in one or more embodiments of the invention. If the storage is performed while the developer is developing the software program, the code that is displayed for the developer may be synchronized with the code in the repository. For example, at a certain interval, such as every minute or day, the project in the project repository may be updated to reflect changes made by the developer. In another example, the project or a file in the project may be updated in the repository based on an explicit instruction, such as a save command. The project may or may not be stored locally on the developer computer system.

Figure 4:
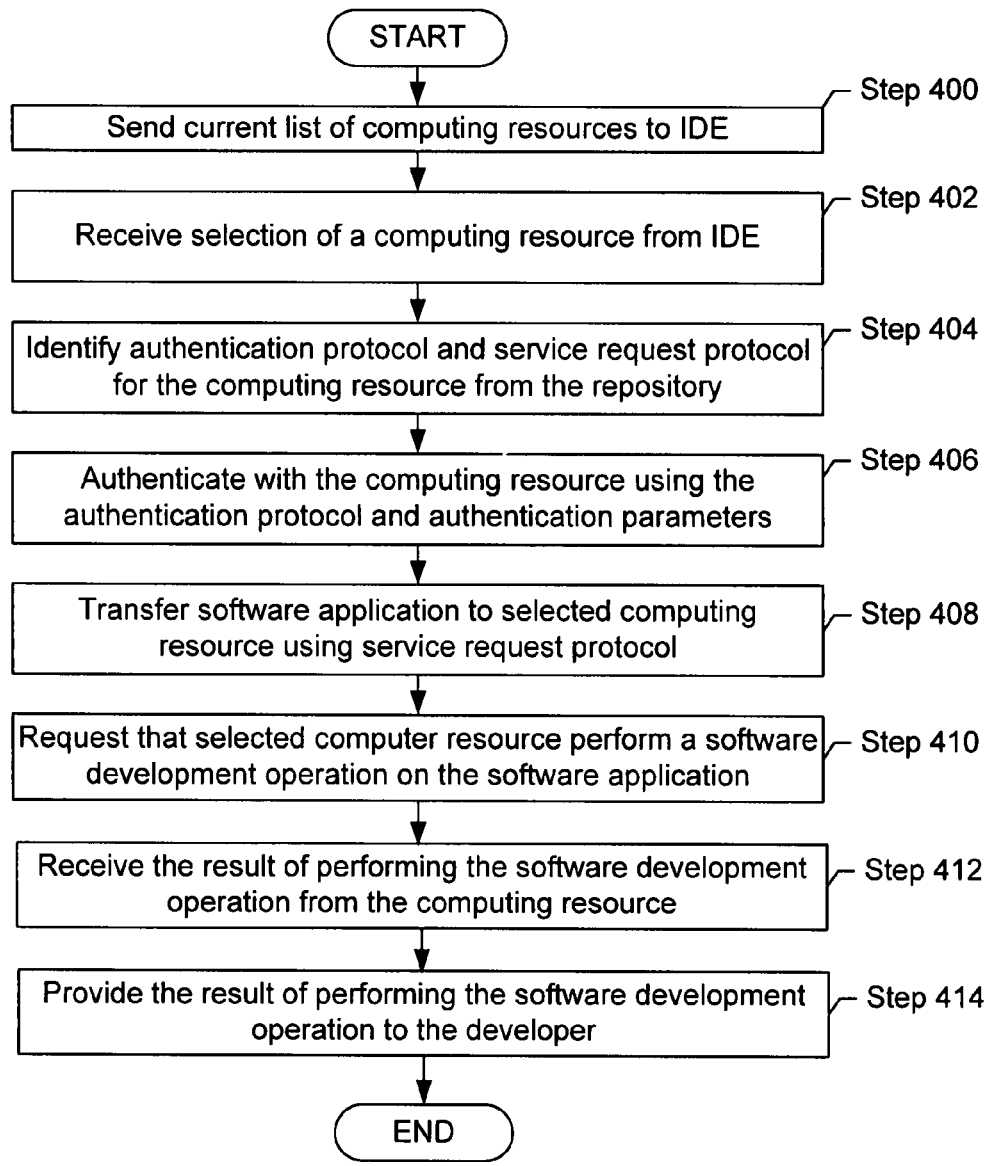

FIG. 4 shows a flowchart of a method for requesting a software development operation from a computing resource in accordance with one or more embodiments of the invention. Initially, the current list of computing resources is sent to the IDE (Step 400). For example, a file that includes the list may be sent to the IDE upon request from the IDE. The current list of computing resources may be sent to the IDE when the IDE does not have a current list of computing resources. Determining whether the IDE has the current list may be performed by identifying the version of the list of the IDE and comparing the version of the list at the computing resource broker. If a difference in the version exists, then the list is sent from the computing resource broker to the IDE.

Next, the computing resource broker receives from the IDE a computing resource selected by the developer to provide software development services as a software program is developed (Step 402). Specifically, the IDE may send an identifier of the software program (e.g., a project identifier) and an identifier of the computing resource to the computing resource broker. At this stage, if the developer has not previously provided authentication parameters for the computing resource, the developer may be prompted for authentication parameters for the computing resource.

The authentication protocol and service request protocol for the selected computing resource is then identified from the project repository (Step 404). The computing resource broker may use the identifier of the selected computing resource to access the project repository and obtain the authentication protocol and the service request protocol for the computing resource.

Next, the computing resource broker authenticates with the computing resource using the authentication protocol and the authentication parameters (Step 406). Authenticating with the computing resource may involve executing a management program. In some embodiments of the invention, input parameters for the management programs may be the authentication parameters. Alternatively, the input parameters may specify the location of the authentication parameters. The authentication parameters may be obtained by accessing the developer account in the repository and using the identifier of the computing resource to obtain authentication parameters for the computing resource.

Further, the management program may have instructions for establishing a connection with the computing resource. The API on the computing resource may specify that the computing resource broker should send the authentication parameters with the connection request. Alternatively, the API may specify that once initial connection is established, the computing resource sends a request for the authentication parameters. If the authentication parameters are valid, then the computing resource broker is authenticated to use the computing resource on behalf of the developer.

Continuing with FIG. 4, if needed, the software program is transferred to the selected computing resource according to the API in one or more embodiments of the invention (Step 408). Specifically, the service request protocol may be used to specify how to transfer the software program. If the service request protocol is a management program, the computing resource broker may use the software program or the location of the software program as input into the management program. Further, transferring the software program may involve copying components of the software program from the project repository to the computing resource.

Once the software program is transferred, a software development operation (i.e., a software development service) is requested from the selected computing resource according to the API (Step 410). At this stage, the computing resource broker requests the software development operation using the service request protocol. When the software development operation is complete, the computing resource broker receives the result of the software development operation from the computing resource (Step 412).

The result may be received, for example, in a results file. If the software development operation was successful, the result may include information regarding the outcome of the requested operations. For example, if an execution operation was requested, the results may specify statistical data about the execution of the software program as well as output from the execution. If the software development operation was not successful, the result may include an error message. For example, if a compilation operation was requested, if the software program does not compile successfully on the computing resource, an error message or messages are returned as part of the result. In another example, if an execution operation is requested, the computing resource may generate an error message while executing the developer program, such as an overflow error. The overflow error message may be returned as part of the result.

When a result is received, the result may be forwarded to the IDE for viewing by the developer (Step 414). Specifically, the computing resource broker may receive the result from the computing resource, identify the IDE which requested the software development operation, and forward the result to the IDE. When forwarding the result to the IDE, the computing resource broker may store the result in the project repository. Further, the computing resource broker may generate an alert flag which specifies that the result exists. For example, when the developer is subsequently authenticated to the computing resource broker via the IDE, the computing resource broker may access the developer account in the repository and check for an alert. When an alert exists, the computing resource broker may obtain the result from the developer account and forward the result to the IDE. The IDE may then provide the developer with the result.

In some embodiments of the invention, if the developer is not logged into an IDE when the software development operation completes, the computing resource broker may notify the developer via email or a text message when the software development operation returns a result. Further, the computing resource broker may periodically notify the developer of the status of a requested software development operation.

Further, once the software development operation completes, the computing resource broker may remove the software program from the computing resource. Specifically, the computing resource broker may use the service request protocol to delete any files belonging to the software program from the computing resource.

In some embodiments of the invention, the developer may monitor the progress of the requested software development operation using the IDE and may optionally request that the operation be aborted. For example, the developer may request the status of an execution operation. The computing resource broker then requests the status from the computing resource and returns the status to the IDE. If the developer is thinks that some there is a problem with the execution based on the status, the developer may then request that the computing resource broker abort the execution operation.

Figure 5:
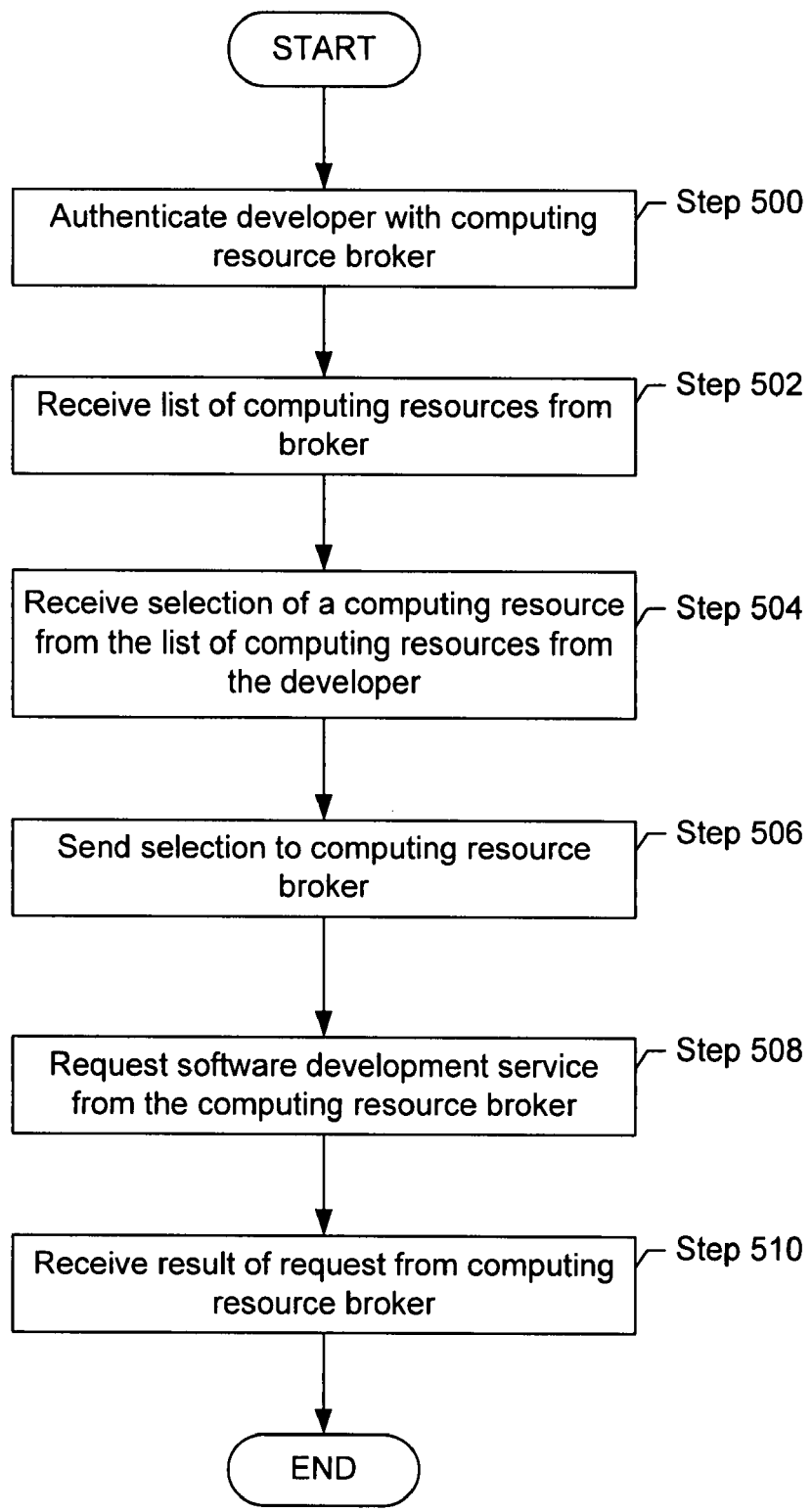

FIG. 5 shows a flowchart for using an IDE to request a software development operation from a computing resource in accordance with one or more embodiments of the invention. Initially, the IDE authenticates the developer with the computing resource broker (Step 500). Specifically, the IDE receives authentication parameters from the developer and forwards the authentication parameters to the computing resource broker. Once authenticated, the developer may use the computing resource broker via the IDE.

Additionally, the IDE receives a list of computing resources from the computing resource broker (Step 502). In some embodiments of the invention, the IDE may request the list of computing resources from the computing resource broker. The list may only include those computing resources the developer is authorized to use or may include all computing resources known to the computing resource broker. Alternatively, the computing resource broker may periodically send an updated list to the IDE. After receiving the list of computing resources, the IDE may display the list for the developer upon request. For example, the IDE may display the list in a drop down menu, a selection box, as part of a help tool for the developer to type in the name of the computing resource, etc.

After displaying the current list of computing resources, the IDE receives a selection of a computing resource from the developer (Step 504). The IDE sends the selection to the computing resource broker (Step 506). When sending the selection, the IDE may include the software program or an identifier of the software program. As the developer is developing the software program, the IDE may send a request for a software development service to the computing resource broker (Step 508). For example, the developer may request compilation of the software program, which causes the IDE to send a request to the computing resource broker to have the software program compiled on the selected computing resource.

In some embodiments of the invention, once the request is sent, the developer may close the IDE and start an IDE on a different computing device at a later time. For example, if an execution operation is requested and the software program requires a lengthy amount of time for execution, the developer may close the IDE overnight and restart the IDE the next day to view the result of the execution.

When the IDE is restarted, or when the requested software development completes, the IDE may receive the results of the software development operation from the computing resource broker (Step 510). In some embodiments of the invention, the computing resource broker may send an alert to the IDE indicating that the result is available for the IDE. The IDE may obtain the result and display the result for the developer. Rather than displaying the result, the IDE may store the results locally on the developer computer system in order for the developer to interact with the result, such as by performing a statistical analysis.

Figure 6:
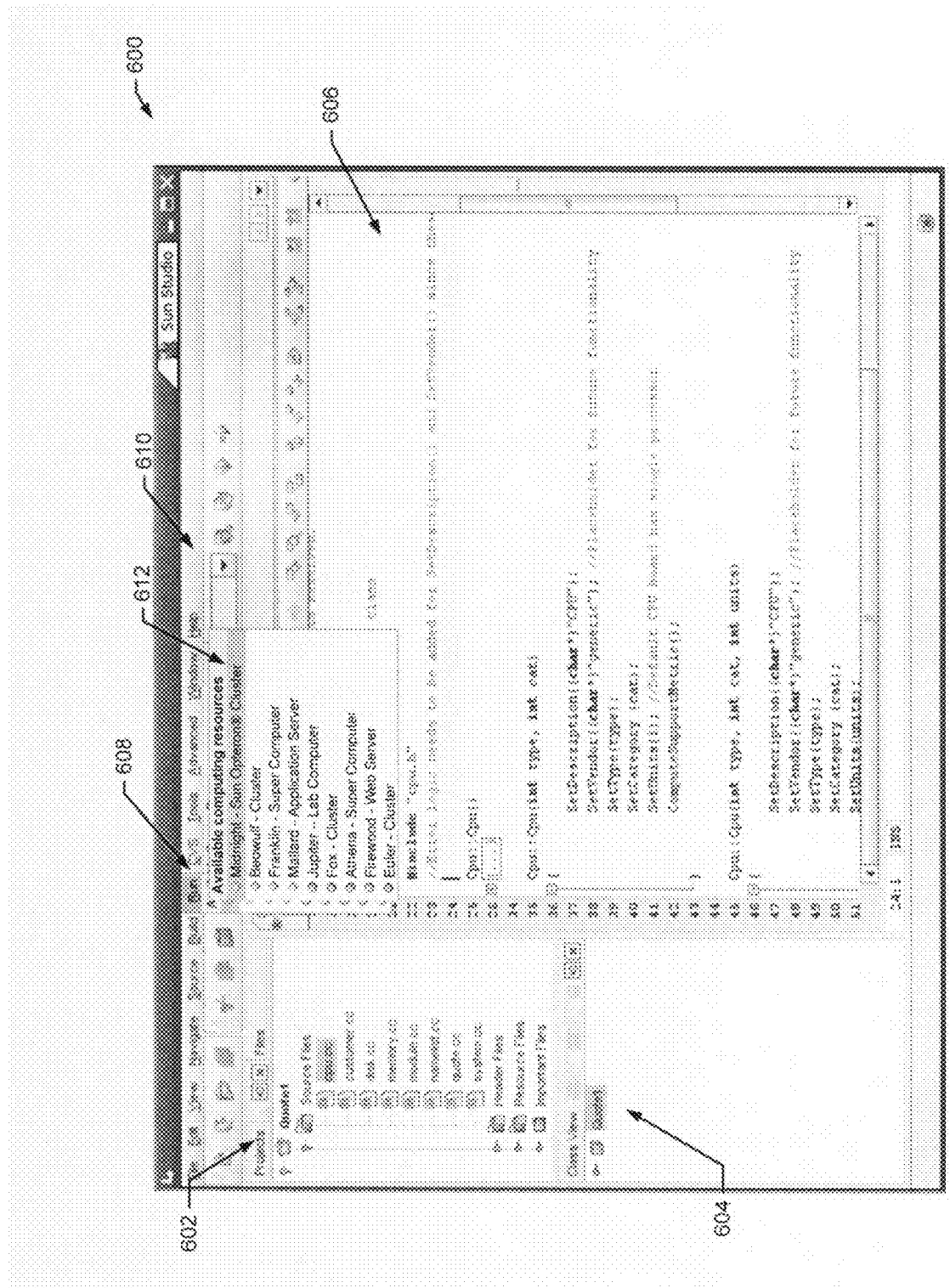
FIG. 6 shows an example user interface in accordance with one or more embodiments of the invention.

FIG. 6 show an example user interface for an IDE (600) in accordance with one or more embodiments of the invention. In the example, consider the scenario in which the developer is developing a software program which has multiple source files. The developer may view the source files in a project window (602). Alternatively, the developer may view a particular class of the software program using the class view (604). The developer may also use an editor area (606) to edit and create the source code. While the developer is developing the software program, the IDE updates the project repository with the most recent version of the software program. In the example, when the developer has completed creating the software program, the developer may select "run" (608) from a menu bar (610). Upon selection of "run", a list of available computing resources (612) may be displayed for the developer.

After viewing the list of available computing resources (612), the developer may make a selection from the list. Upon receiving the selection, the IDE sends a request identifying the selected computing resource and the software program to the computing resource broker. The computing resource broker interacts with the selected computing resource to authenticate the developer, copy the software program to the selected computing resource, and request execution of the software program on the selected computing resource. Once the software program is executed, the computing resource broker forwards the results of the execution to the IDE which displays the results in the user interface (600) for the developer to view.

Embodiments of the invention allow a developer to develop software programs for multiple computing resources using a single IDE. Further, a developer is not required to know specific details about how to use the software development tools and execution environments of the computing resources. More specifically, a computing resource broker provides the functionality to interface with the computing resources and cause requested software development operations to be performed on the computing resources.

Figure 7:
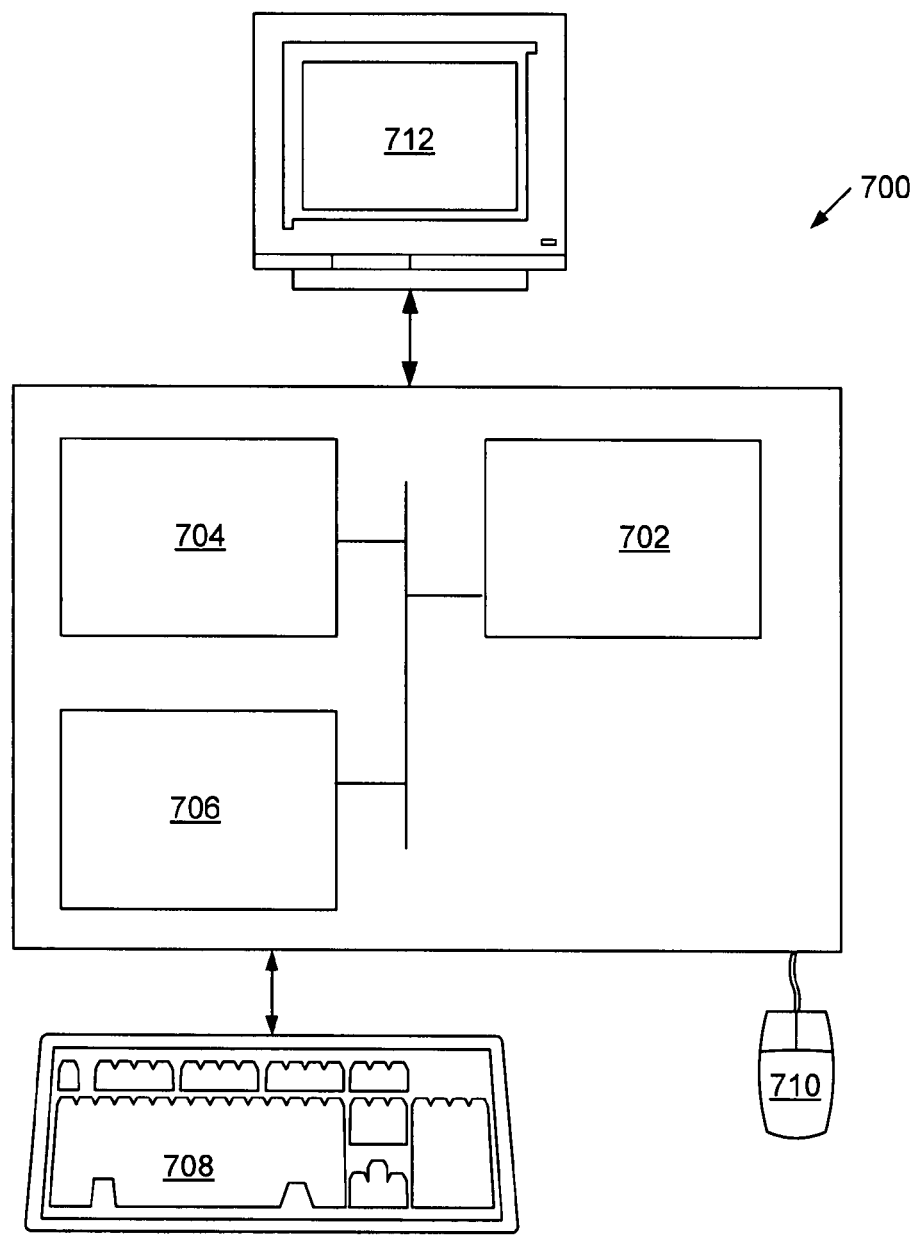
FIG. 7 shows a computer system in accordance with one or more embodiments of the invention.

Embodiments of the invention may be implemented on virtually any type of computer regardless of the platform being used. For example, as shown in FIG. 7, a computer system (700) includes a processor (702), associated memory (707), a storage device (706), and numerous other elements and functionalities typical of today's computers (not shown). The computer (700) may also include input means, such as a keyboard (708) and a mouse (710), and output means, such as a monitor (712). The computer system (700) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, the invention may be implemented on a distributed system having a plurality of nodes, where each portion of the invention (e.g., broker, repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for software development comprising:
   receiving, by a computing resource broker, a first request to perform a software development operation on a software program using a computing resource,
       wherein the first request is from an integrated development environment (IDE) executing on a developer computer system, and
       wherein the IDE is used to develop the software program;
   obtaining an authentication protocol specifying an authentication procedure for the computing resource from a repository managed by the computing resource broker;
   obtaining, by the computing resource broker, developer authentication parameters for the computing resource from the IDE;
   providing, by the computing resource broker, the developer authentication parameters to the computing resource using the authentication protocol;
   sending, by the computing resource broker, a second request to perform the software development operation to the computing resource in response to a determination that the computing resource broker is authenticated by the computing resource to use the computing resource;
   receiving a result of performing the software development operation from the computing resource; and
   sending the result to the IDE, wherein the result is displayed to a developer of the software program.

2. The method of claim 1, further comprising:
   receiving a selection of the computing resource from the IDE, wherein the selection is from a plurality of computing resources registered with the computing resource broker.

3. The method of claim 1, wherein sending the first request further comprises:
   obtaining a service request protocol for the computing resource from the repository; and
   using the service request protocol to send the second request.

4. The method of claim 1, wherein sending the second request further comprises:
   transferring the software program to the computing resource.

5. The method of claim 1, further comprising:
   storing the software program in the repository.

6. The method of claim 1, further comprising:
   storing the result in the repository; and
   notifying the developer that the result is available.

7. The method of claim 3, further comprising:
   registering the computing resource with the computing resource broker, wherein the authentication protocol and the service request protocol are created based on an application programming interface (API) of the computing resource.

8. The method of claim 7, further comprising:
   installing a broker agent on the computing resource, wherein the broker agent provides the API.

9. The method of claim 1, wherein the software development operation is at least one selected from a group consisting of a compilation operation, a build operation, a debug operation, an execution operation, a project management operation, and a resource management operation.

10. A system for software development comprising:
a processor;
a repository configured to store an authentication protocol for each computing resource of a plurality of computing resources registered with a computing resource broker; and
the computing resource broker executing on the processor and configured to:
  receive a first request to perform a software development operation on a software program using a computing resource of the plurality of computing resources, wherein the first request is from an integrated development environment (IDE) executing on a developer computer system, and wherein the IDE is used to develop the software program;
  obtain an authentication protocol specifying an authentication procedure for the computing resource from the repository;
  obtain, by the computing resource broker, developer authentication parameters for the computing resource from the IDE;
  provide, by the computing resource broker, the developer authentication parameters to the computing resource using the authentication protocol;
  send, by the computing resource broker, a second request to perform the software development operation to the computing resource in response to a determination that the computing resource broker is authenticated by the computing resource to use the computing resource;
  receive a result of performing the software development operation from the computing resource; and
  send the result to the IDE, wherein the result is displayed to a developer of the software program.

11. The system of claim 10, wherein the computing resource broker is further configured to receive a selection of the computing resource from the IDE.

12. The system of claim 10, wherein the repository is further configured to store an authentication protocol for each computing resource of the plurality of computing resources; and wherein the computing resource broker is further configured to send the second request by:
  obtaining the service request protocol for the computing resource from the repository; and
  using the service request protocol to send the second request.

13. The system of claim 10, wherein the computing resource broker is further configured to transfer the software program to the computing resource.

14. The system of claim 10, wherein the computing resource broker is further configured to store the software program in the repository.

15. The system of claim 10, wherein the computing resource broker is further configured to:
  store the result in the repository; and
  notify the developer that the result is available.

16. The system of claim 12, wherein the computing resource broker is further configured to register the computing resource, wherein the authentication protocol and the service request protocol are created based on an API of the computing resource.

17. The system of claim 16, wherein the computing resource broker is further configured to install a broker agent on the computing resource, wherein the broker agent provides the API.

18. The system of claim 10, wherein the software development operation is at least one selected from a group consisting of a compilation operation, a build operation, a debug operation, an execution operation, a project management operation, and a resource management operation.

19. A non-transitory computer readable medium comprising computer program code embodied therein for causing a computer system to facilitate software development, the computer program code comprising program instructions to:
  receive, by a computing resource broker, a first request to perform a software development operation on a software program using a computing resource, wherein the first request is from an integrated development environment (IDE) executing on a developer computer system, and wherein the IDE is used to develop the software program;
  obtain an authentication protocol specifying an authentication procedure for the computing resource from a repository managed by the computing resource broker;
  obtain, by the computing resource broker, developer authentication parameters for the computing resource from the IDE;
  providing, by the computing resource broker, the developer authentication parameters to the computing resource using the authentication protocol;
  send, by the computing resource broker, a second request to perform the software development operation to the computing resource in response to a determination that the computing resource broker is authenticated by the computing resource to use the computing resource;
  receive a result of performing the software development operation from the computing resource; and
  send the result to the IDE, wherein the result is displayed to a developer of the software program.

20. The non-transitory computer readable medium of claim 19, wherein the computer program code further comprises program instructions to:
  receive a selection of the computing resource from the IDE, wherein the selection is from a plurality of computing resources registered with the computing resource broker.

* * * * *